(12) United States Patent
Branagan

(10) Patent No.: US 7,067,022 B2
(45) Date of Patent: Jun. 27, 2006

(54) METHOD FOR PROTECTING A SURFACE

(75) Inventor: Daniel J. Branagan, Iona, ID (US)

(73) Assignee: Battelle Energy Alliance, LLC, Idaho Falls, ID (US)

( * ) Notice: Subject to any disclaimer, the term of this patent is extended or adjusted under 35 U.S.C. 154(b) by 31 days.

(21) Appl. No.: 10/753,168

(22) Filed: Jan. 5, 2004

(65) Prior Publication Data
US 2004/0140021 A1 Jul. 22, 2004

Related U.S. Application Data

(60) Division of application No. 10/172,095, filed on Jun. 13, 2002, now Pat. No. 6,689,234, which is a continuation-in-part of application No. 09/709,918, filed on Nov. 9, 2000, now Pat. No. 6,767,419.

(51) Int. Cl.
*C21D 1/09* (2006.01)
*C23C 4/06* (2006.01)
*C23C 4/16* (2006.01)

(52) U.S. Cl. ............... 148/525; 148/529; 148/561

(58) Field of Classification Search ........... 148/522, 148/525, 529, 537, 561
See application file for complete search history.

(56) References Cited

U.S. PATENT DOCUMENTS

| | | |
|---|---|---|
| 4,365,994 A | 12/1982 | Ray |
| 4,439,236 A | 3/1984 | Ray |
| 4,725,512 A | 2/1988 | Scruggs |
| 4,820,141 A | 4/1989 | Shingu et al. |
| 4,822,415 A | 4/1989 | Dorfman et al. |
| 5,294,462 A | 3/1994 | Kaiser et al. |
| 5,643,531 A | 7/1997 | Kim et al. |
| 6,258,185 B1 | 7/2001 | Branagan et al. |
| 6,261,386 B1 | 7/2001 | Perepezko et al. |
| 6,270,591 B1 | 8/2001 | Chriac et al. |
| 6,773,817 B1 * | 8/2004 | Sagel et al. ............ 428/457 |

FOREIGN PATENT DOCUMENTS

| | | |
|---|---|---|
| JP | 363219553 | 9/1988 |
| JP | 402170950 | 7/1990 |
| JP | 405005164 | 1/1993 |
| JP | 405271885 | 10/1993 |
| JP | 406041675 | 2/1994 |
| JP | 408323480 | 12/1996 |
| JP | 409003608 | 1/1997 |
| JP | 409256117 | 9/1997 |
| JP | 410060607 | 3/1998 |
| JP | 410081914 | 3/1998 |
| JP | 410306314 | 11/1998 |
| JP | 411086641 | 3/1999 |

* cited by examiner

Primary Examiner—Ngoclan T. Mai
(74) Attorney, Agent, or Firm—Wells St. John, P.S.

(57) ABSTRACT

The invention includes a method of producing a hard metallic material by forming a mixture containing at least 55% iron and at least one of B, C, Si and P. The mixture is formed into an alloy and cooled to form a metallic material having a hardness of greater than about 9.2 GPa. The invention includes a method of forming a wire by combining a metal strip and a powder. The strip and the powder are rolled to form a wire containing at least 55% iron and from 2–7 additional elements including at lease one of C, Si and B. The invention also includes a method of forming a hardened surface on a substrate by processing a solid mass to form a power, applying the powder to a surface to form a layer containing metallic glass, and converting the glass to a crystalline material having a nanocrystalline grain size.

3 Claims, 17 Drawing Sheets

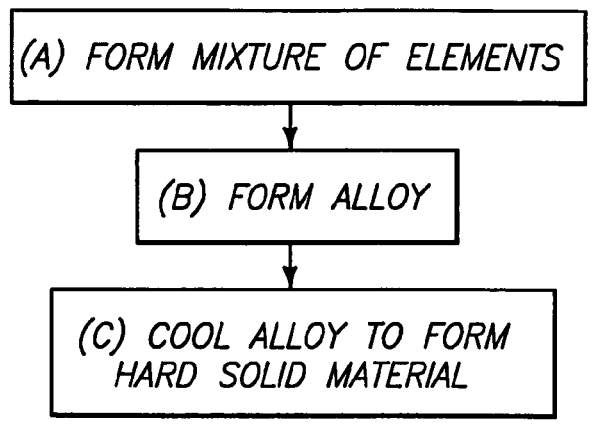
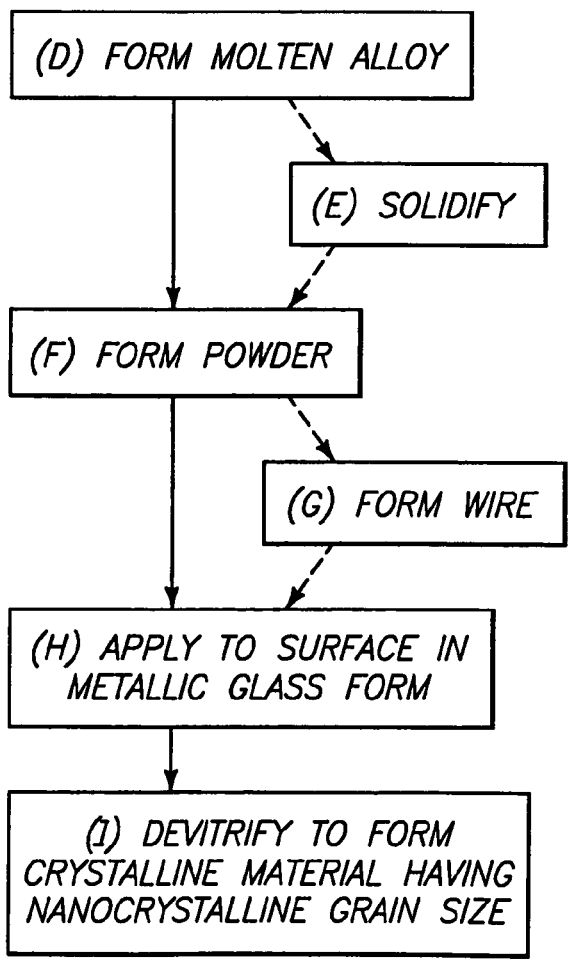

METHOD FOR PROTECTING A SURFACE

RELATED PATENT DATA

This application is divisional of U.S. application Ser. No. 10/172,095 filed Jun. 13, 2002 now U.S. Pat. No. 6,689,234 which is a continuation-in-part of U.S. application Ser. No. 09/709,918 which was filed on Nov. 9, 2000 now U.S. Pat. No. 6,767,419 and which is hereby incorporated by reference.

CONTRACTUAL ORIGIN OF THE INVENTION

This invention was made with United States Government support under contract number DE-AC07-99ID13727, awarded by the. United States Department of Energy. The United States Government has certain rights in the invention.

TECHNICAL FIELD

The invention pertains to hard metallic materials and methods of forming hard metallic materials.

BACKGROUND OF THE INVENTION

Steel is a metallic alloy which can have exceptional strength characteristics, and which is accordingly commonly utilized in structures where strength is required or advantageous. Steel can be utilized, for example, in the skeletal supports of building structures, tools, engine components, and protective shielding of modern armaments.

The composition of steel varies depending on the application of the alloy. For purposes of interpreting this disclosure and the claims that follow, "steel" is defined as any iron-based alloy in which no other single element (besides iron) is present in excess of 30 weight percent, and for which the iron content amounts to at least 55 weight percent, and carbon is limited to a maximum of 2 weight percent. In addition to iron, steel alloys can incorporate, for example, manganese, nickel, chromium, molybdenum, and/or vanadium. Accordingly, steel typically contains small amounts of phosphorus, carbon, sulfur and silicon.

Steel comprises regular arrangements of atoms, with the periodic stacking arrangements forming 3-dimensional lattices which define the internal structure of the steel. The internal structure (sometimes called "microstructure") of conventional steel alloys is always metallic and polycrystalline (consisting of many crystalline grains). Both composition and processing methods are important factors that effect the structure and properties of a steel material. In conventional steel processing, an increase in hardness can be accompanied by a Corresponding decrease in toughness. Steel material produced by conventional methods that increase the hardness of the composition can result in a steel material that is very brittle.

Steel is typically formed by cooling a molten alloy. For conventional steel alloys, the rate of cooling will determine whether the alloy cools to form an internal structure that predominately comprises crystalline grains, or, in rare cases a structure which is predominately amorphous (a so called metallic glass). Generally, it is found that if the cooling proceeds slowly (i.e. at a rate less that about $10^4$ K/s), large grain sizes occur, while if the cooling proceeds rapidly (i.e. at rate greater than or equal to about $10^4$ K/s) microcrystalline internal grain structures are formed, or, in specific rare cases not found in conventional steel alloy compositions, an amorphous metallic glass is formed. The particular composition of a molten alloy generally determines weather the alloy solidifies to form microcrystalline grain structures or an amorphous glass when the alloy is cooled rapidly.

Both microcrystalline grain internal structures and metallic glass internal structures can have properties which are desirable in particular applications for steel. In some applications, the amorphous character of metallic glass can provide desired properties. For instance, some glasses can have exceptionally high strength and hardness. In other applications, the particular properties of microcrystalline grain structures are preferred. Frequently, if the properties of a grain structure are preferred, such properties will be improved by decreasing the grain size. For instance, desired properties of microcrystalline grains (i.e., grains having a size on the order of $10^{-6}$ meters) can frequently be improved by reducing the grain size to that of nanocrystalline grains (i.e., grains having a size on the order of $10^{-9}$ meters). It is generally more problematic, and not generally possible utilizing conventional approaches, to form grains of nanocrystalline grain size than it is to form grains of microcrystalline grain size.

It is desirable to develop improved methods for forming nanocrystalline grain size steel materials. Further, as it is frequently desired to have metallic glass structures, it is desirable to develop methods of forming metallic glasses. Still further, it is desirable to develop methods of processing steel that can achieve an increased hardness without a corresponding loss of toughness.

SUMMARY OF THE INVENTION

In one aspect, the invention encompasses a method of producing a hard metallic material. A mixture of elements containing at least about 55% iron by weight, and at least one of B, C, Si and P is formed into an alloy and the alloy is cooled at a rate of less than about 5000 K/s to form a metallic material having a hardness of greater than about 9.2 GPa. In one aspect the invention encompasses a metallic material comprising at least 55% iron and at least one of B, Si, P and C. The material has a total element composition of fewer than eleven elements, excluding impurities, has a melting temperature between about 1100° C. and about 1250° C. and has a hardness of greater than about 9.2 GPa. In one aspect the invention encompasses a method of forming a wire. A metal strip having a first composition and a powder having a second composition are rolled/extruded together to combine the first composition and the second composition to form a wire having a third composition. The third composition contains at least 55% iron, by weight, and from 2–7 additional elements including at least one of C, Si and B.

In one aspect the invention encompasses a method of forming a hardened surface on a substrate. A solid mass having a first hardness is processed to form a powder. The powder is applied to a surface of a substrate to form a layer having a second hardness. At least some of the layer contains metallic glass which may be converted to a crystalline material having a nanocrystalline grain size. The converting the metallic glass to a crystalline material hardens the layer to a third hardness that is greater than the first hardness and greater than the second hardness.

BRIEF DESCRIPTION OF THE DRAWINGS

Preferred embodiments of the invention are described below with reference to the following accompanying drawings.

FIG. 1 is a block-diagram flow chart view of a method encompassed by the present invention.

FIG. 2 is a block-diagram flow chart view of a processing method encompassed by the present invention.

FIG. 18 illustrates measured (Panel A) and Rietveld refined (calculated, Panel B) x-ray diffraction patterns of a high velocity oxy-fuel coating comprising the composition $(Fe_{0.8}Cr_{0.2})_{73}Mo_2W_2B_{16}C_4Si_1Mn_2$ after heat treating the coating for 1 hour at 750° C.

DETAILED DESCRIPTION OF THE PREFERRED EMBODIMENTS

Figure 3:
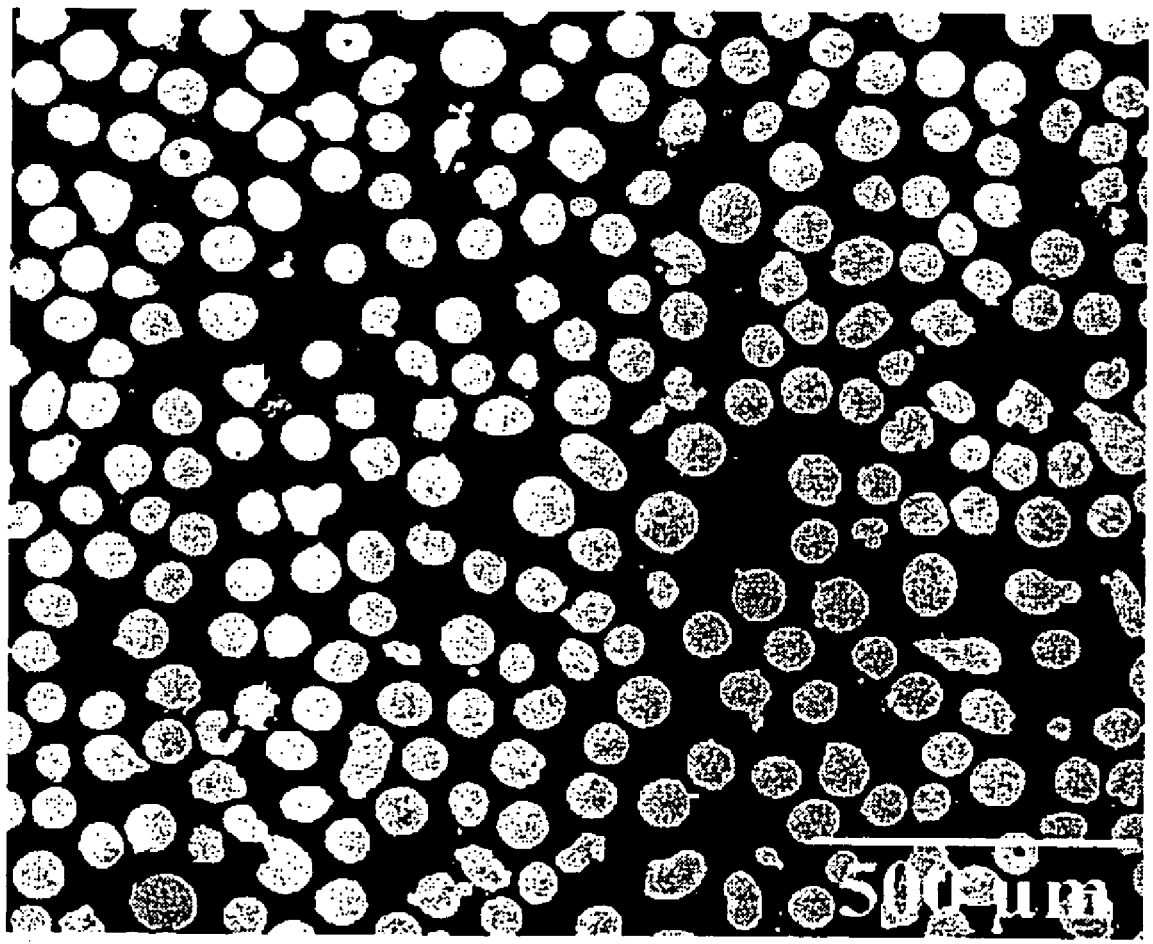
FIG. 3 is a SEM micrograph of a metallic powder produced by methods of the present invention.

This disclosure of the invention is submitted in furtherance of the constitutional purposes of the U.S. Patent Laws "to promote the progress of science and useful arts" (Article 1, Section 8).

The invention encompasses methodology for forming metallic glass steel materials and for forming steel materials having nanocrystalline scale composite microstructures, methods of utilizing such steel materials, and also encompasses the steel material compositions. A process encompassed by the present invention is described generally with reference to the block diagram of FIG. 1. At an initial step (A) a mixture of elements is formed. Such mixture comprises a steel composition. An exemplary mixture comprises at least 55% iron, by weight, and can comprise at least one element selected from the group consisting of B, C, Si and P. In particular aspects of the present invention, the mixture will comprise at least two of B, C and Si. The mixture can comprise B, C and Si, and in particular embodiments the mixture can comprise B, C and Si at an atomic ratio of $B_{17}C_5Si_1$. In particular aspects of the present invention, the mixture can contain at least one transition metal which can be, for example, selected from the group consisting of W, Mo, Cr and Mn. In addition, the mixture can contain one or more of Al and Gd.

Mixtures of the present invention preferably comprise fewer than eleven elements, and can more preferably comprise fewer than nine elements. Additionally, the mixtures can comprise as few as two elements. In particular embodiments, the mixture can consist essentially of or can consist of fewer than eleven elements. Further, the mixture can consist essentially of, or can consist of as few as two elements. Generally, mixtures of the present invention are composed of from four to eight elements.

Exemplary mixtures which can be utilized in methodology of the present invention are: $Fe_{63}Mo_2Si_1$, $Fe_{63}Cr_8Mo_2$, $Fe_{63}Mo_2Al_4$, $(Fe_{0.8}Cr_{0.2})_{81}B_{17}W_2$, $(Fe_{0.8}Mo_{0.2})_{83}B_{17}$, $Fe_{63}B_{17}Si_1$, $Fe_{63}Cr_8Mo_2C_5$, $Fe_{63}Mo_2C_5$, $Fe_{80}Mo_{20}$, $Fe_{63}Cr_8Mo_2B_{17}$, $Fe_{83}B_{17}$, $Fe_{63}B_{17}Si_5$, $Fe_{63}B_{17}C_2$, $Fe_{63}B_{17}C_3Si_3$, $(Fe_{0.8}Cr_{0.2})_{79}B_{17}W_2C_2$, $Fe_{63}B_{17}C_3Si_5$, $Fe_{63}B_{17}C_2W_2$, $Fe_{63}B_{17}C_8$, $Fe_{63}B_{17}C_5$, $(Fe_{0.8}Cr_{0.2})_{78}Mo_2W_2B_{12}C_5Si_1$, $Fe_{63}B_{17}C_5W_5$, $Fe_{63}B_{17}C_5Si_5$, $(Fe_{0.8}Cr_{0.2})_{76}Mo_2W_2B_{14}C_5Si_1$, $(Fe_{0.8}Cr_{0.2})_{73}Mo_2W_2B_{16}C_4Si_1Mn_2$, $Fe_{63}Cr_8Mo_2B_{17}C_5$, $(Fe_{0.8}Cr_{0.2})_{75}Mo_2B_{17}C_5Si_1$, $Fe_{63}Cr_8Mo_2B_{17}C_5Si_1Al_4$, $(Fe_{0.8}Cr_{0.2})_{75}W_2B_{17}C_5Si_1$, $Fe_{63}B_{17}C_5Si_1$, $(Fe_{0.8}Cr_{0.2})_{73}Mo_2W_2B_{17}C_5Si_1$, $(Fe_{0.8}Cr_{0.2})_{72}Mo_2W_2B_{17}C_5Si_1Gd_1$, $(Fe_{0.8}Cr_{0.2})_{71}Mo_2W_2B_{17}C_5Si_1Gd_2$, and $(Fe_{0.8}Cr_{0.2})_{74}Mo_2W_2B_{17}C_4Si_1$.

At step (B) of FIG. 1, the mixture can be formed into an alloy. Alloy formation step (B) can comprise, for example, melting a composition under an argon atmosphere.

At step (C) of FIG. 1, the alloy can be cooled to form a hard material comprising a solid mass. Cooling of conventional steel alloys to form solid materials typically comprises cooling at a rate of at least about 5000 K/s, in order to achieve a hard steel solid. For purposes of the present description, cooling at a rate of at least about 5000 K/s can be referred to as rapid cooling. Rapid cooling can be accomplished by a number of different processes, including, for example, melt-spinning, gas atomization, centrifugal atomization, water atomization and splat quenching. Alternatively, Step (C) of FIG. 1 can comprise fast cooling or alternatively can comprise slow cooling (cooling at a rate of less than or equal to about 5000 K/s) to form a hard solid material. Slow cooling of an alloy can preferably comprise cooling at a rate of less than about 5000 K/s and can utilize methods such as arc-melting, casting, sand casting, investment casting, etc. The rate of cooling and the resulting hardness of the hard metallic material can vary depending on the particular composition of the mixture used to form the alloy. In particular embodiments, a hard metallic material formed by the methods of the present invention can comprise a hardness of greater than about 9.2 GPa. Additionally, contrary to conventional steels compositions that are rapidly cooled to achieve high hardness, particular alloy compositions of the present invention can achieve extreme hardness (greater than about 9.2 GPa) by slow cooling.

The hard solid material formed in step (C) of FIG. 1 can comprise a melting temperature of, for example, between about 1100° C. and about 1550° C. The hard solid material formed in step (C) of FIG. 1 is not limited to a specific form and can be, for example, a cast material including but not limited to an ingot form. The formation of a hard solid material by the processing steps shown in FIG. 1 can comprise standard metallurgy techniques including, but not limited to, arc-melting, investment casting, sand casting, spray forming and spray rolling.

Measured hardness (GPa) for as-cast ingots of selected compositions encompassed by the present invention are reported in Table 1. The ingots were cut in half with a diamond saw, metallo-graphically mounted, and tested for hardness, with each reported hardness value representing an average of ten measurements. As shown in Table 1, the resulting as-cast ingots can comprise a hardness as high as 14.9 GPa.

Although the cooled alloy in solid mass form can comprise a very high hardness, the hardness can be accompanied by very low toughness. Due to the low thoroughness, ingots formed as described above can be very brittle and can shatter upon impact, as, for example, when struck with a hammer. However, contrary to an observed decrease in toughness that accompanies increased hardness in materials produced by conventional steel processing, further processing of the solid mass material by methods of the present invention(discussed below) can produce materials having hardness and increased toughness relative to the ingot form.

TABLE 1

Hardness of Ingots

| Ingot Composition | Hardness (GPa) |
| --- | --- |
| $Fe_{63}B_{17}C_3Si_3$ | 10.3 |
| $(Fe_{0.8}Cr_{0.2})_{79}B_{17}W_2C_2$ | 10.8 |
| $Fe_{63}B_{17}C_3Si_5$ | 11.1 |
| $Fe_{63}B_{17}C_2W_2$ | 11.2 |
| $Fe_{63}B_{17}C_8$ | 11.9 |
| $Fe_{63}B_{17}C_5$ | 12.1 |
| $(Fe_{0.8}Cr_{0.2})_{78}Mo_2W_2B_{12}C_5Si_1$ | 12.1 |
| $Fe_{63}B_{17}C_5W_5$ | 12.3 |
| $Fe_{63}B_{17}C_5Si_5$ | 12.3 |
| $(Fe_{0.8}Cr_{0.2})_{76}Mo_2W_2B_{14}C_5Si_1$ | 12.3 |
| $(Fe_{0.8}Cr_{0.2})_{73}Mo_2W_2B_{16}C_4Si_1Mn_2$ | 12.3 |
| $Fe_{63}Cr_8Mo_2B_{17}C_5$ | 12.5 |
| $(Fe_{0.8}Cr_{0.2})_{75}Mo_2B_{17}C_5Si_1$ | 12.7 |
| $Fe_{63}Cr_8Mo_2B_{17}C_5Si_1Al_4$ | 13.2 |
| $(Fe_{0.8}Cr_{0.2})_{75}W_2B_{17}C_5Si_1$ | 13.4 |
| $Fe_{63}B_{17}C_5Si_1$ | 13.7 |
| $(Fe_{0.8}Cr_{0.2})_{73}Mo_2W_2B_{17}C_5Si_1$ | 14.0 |
| $(Fe_{0.8}Cr_{0.2})_{72}Mo_2W_2B_{17}C_5Si_1Gd_1$ | 14.4 |
| $(Fe_{0.8}Cr_{0.2})_{71}Mo_2W_2B_{17}C_5Si_1Gd_2$ | 14.7 |
| $(Fe_{0.8}Cr_{0.2})_{74}Mo_2W_2B_{17}C_4Si_1$ | 14.9 |

Additional and alternative processing of the alloy of FIG. 1 step (B) and the hard solid material of FIG. 1 step (C) is described generally with reference to the block diagram of FIG. 2. An alloy according to methods of the present invention can comprise a molten alloy as shown in FIG. 2 step (D). The molten alloy can be solidified in step (E) by rapid cooling or by slow cooling according to the methods discussed above. The solidified material can be subjected to a further processing step (F) to form a powder. Alternatively, the molten alloy of step (D) can be directly subjected to powder formation step (F).

Processing the solid material step of step (E) into a powder form can comprise, for example, various conventional grinding or milling steps or atomization methods such as, for example, gas, water, or centrifugal atomization to produce a metallic powder. In particular embodiments of the present invention, it can be advantageous to process a solid material to form powder utilizing atomization techniques since such processing can produce large amounts of stable, non-reactive powders of a desired size range in a single step. Atomization methods can produce spherical powders which can be especially advantageous since spherical particles can flow easily allowing improved passage through a thermal deposition device (see below). The spherical nature of powder particles produced from a hard steel ingot of alloy composition is shown in FIG. 3.

In particular aspects of the present invention, formation of powder particles by atomization can form powder particles that comprise at least some amorphous microstructure. Due to the high glass forming abilities of compositions of the present invention, rapid solidification during atomization allows direct production of amorphous glass particles. In particular embodiments it can be desirable to produce amorphous particles and thereby limit or eliminate the need to remelt the particles during subsequent deposition. Particular compositions processed by methods of the present invention can produce powders which comprise up to 100% amorphous structure.

As shown in FIG. 2, metallic powder from step (F), can be formed from molten alloy from step (D) according to methods of the present invention without the inclusion of solidification step (E). Such direct powder formation can be achieved by utilizing rapid solidification methods such as radiative cooling, convective cooling, or conductive cooling, or alternatively by any of the atomization methods discussed above with respect to processing of a solid metallic material into powder form. The advantages discussed above with respect to atomization of the solid material apply equally to atomization of a molten alloy according to methods of the present invention.

Prior to a surface application step (H) of FIG. 2, the metallic powder of step F can be further processed by classification (sorting the powder based on particle size (not shown)). Such classification can comprise, for example, sequential sieving and air classification steps. Particle sizes for powders produced by methods of the present invention can comprise sizes from between about 10 µm to about 450 µm. Particle classification of the powder can be used to obtain a specific particle size or range of sizes useful for a chosen material deposition technique. In particular embodiments, classification can be used to produce a powder comprising a particle size of from about 10 to about 100 microns.

Still referring to FIG. 2, a powder produced by methods of the present invention can optionally be utilized for production of a wire in step (G), which can in turn be used for application to a surface in step (H). Wire formation step (G) of FIG. 2 is discussed in more detail with reference to FIGS. 4 and 5.

Figure 4:
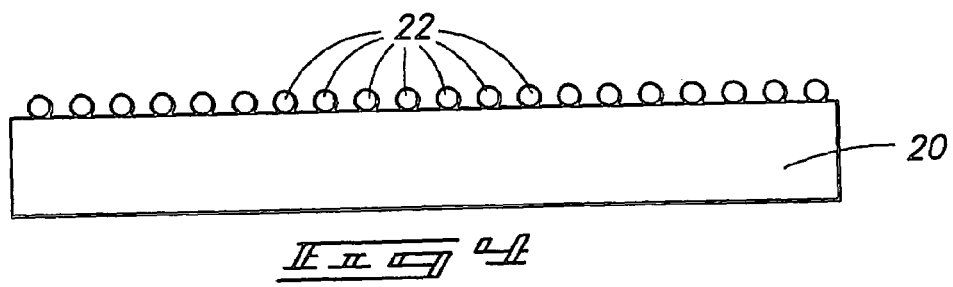
FIG. 4 is a fragmentary, diagrammatic, cross-sectional view of a metallic material at a preliminary processing step of a method of the present invention.
Figure 5:
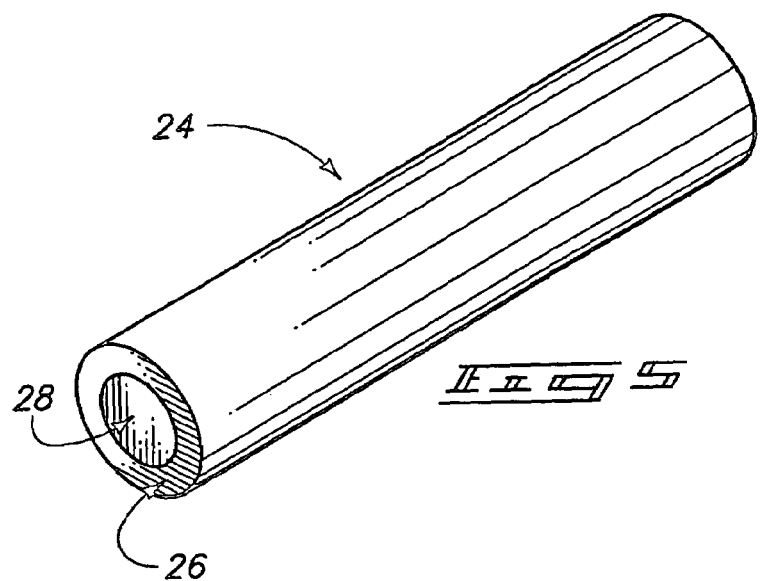
FIG. 5 is a view of the FIG. 4 metallic material shown at a processing step subsequent to that of FIG. 4.

First referring to FIG. 4, wire formation can comprise providing a metal strip 20 that can have a first composition, and providing a powder that can have a second composition. The composition of the metal strip 20 and the composition of powder 22 can be combined to form a desired wire composition for subsequent deposition or other applications. Powder 22 is not limited to a specific powder and can comprise, for example, a powder produced by methods of the present invention discussed above. The composition of metal strip 20 is not limited to any specific composition and can be chosen to supplement the composition of powder 22 to form the desired wire composition Metal strip 20 can be combined with powder 22 and further processed to form wire 24 as shown in FIG. 5. The combining of the metal strip and the powder can comprise, for example, forming a cored wire utilizing conventional rolling/extrusion techniques wherein the powder material forms a core 28 and the metal strip forms a sheath 26 around core 28. Wire 24 is not limited to a specific diameter and can comprise, for example, a diameter of from about 0.035 inches to about 0.188 inches. In particular embodiments, a preferred wire diameter can be $\frac{1}{16}$ inches.

A total composition of wire 24 comprising the combined compositions of core 28 and sheath 26, can include at least 55% iron by weight. The total composition of wire 24 can preferably comprise fewer than eleven elements. In particular embodiments, the total composition of wire 24 can consist essentially of the fewer than 11 elements. Preferably, the total composition of wire 24 can comprise or can consist essentially of from 2–7 elements in addition to the iron. Elements other than iron present in the total composition can include at least one element selected from the group consisting of C, B, P, and Si. In particular embodiments wire 24 can comprise 2, 3 or all of C, B, P, and Si. Wire 24 can, for example, comprise C, Si and B present in the total composition at an atomic ration of $B_{17}C_5Si_1$. The total composition can further contain one or more of W, Mo, Cr, Mn, Al and Gd.

Exemplary total compositions which can be comprised by wire 24 include: $Fe_{63}Mo_2Si_1$, $Fe_{63}Cr_8Mo_2$, $Fe_{63}Mo_2Al_4$, $(Fe_{0.8}Cr_{0.2})_{81}B_{17}W_2$, $(Fe_{0.8}Mo_{0.2})_{83}B_{17}$, $Fe_{63}B_{17}Si_1$, $Fe_{63}Cr_8Mo_2C_5$, $Fe_{63}Mo_2C_5$, $Fe_{80}Mo_{20}$, $Fe_{63}Cr_8Mo_2B_{17}$, $Fe_{83}B_{17}$, $Fe_{63}B_{17}Si_5$, $Fe_{63}B_{17}C_2$, $Fe_{63}B_{17}C_3Si_3$, $(Fe_{0.8}Cr_{0.2})_{79}B_{17}W_2C_2$, $Fe_{63}B_{17}C_3Si_5$, $Fe_{63}B_{17}C_2W_2$, $Fe_{63}B_{17}C_8$, $Fe_{63}B_{17}C_5$, $(Fe_{0.8}Cr_{0.2})_{78}Mo_2W_2B_{12}C_5Si_1$, $Fe_{63}B_{17}C_5W_5$, $Fe_{63}B_{17}C_5Si_5$, $(Fe_{0.8}Cr_{0.2})_{76}Mo_2W_2B_{14}C_5Si_1$, $(Fe_{0.8}Cr_{0.2})_{73}Mo_2W_2B_{16}C_2Si_1Mn_2$, $Fe_{63}Cr_8Mo_2B_{17}C_5$, $(Fe_{0.8}Cr_{0.2})_{75}Mo_2B_{17}C_5Si_1$, $Fe_{63}Cr_8Mo_2B_{17}C_5Si_1Al_4$, $(Fe_{0.8}Cr_{0.2})_{75}W_2B_{17}C_5Si_1$, $Fe_{63}B_{17}C_5Si_1$, $(Fe_{0.8}Cr_{0.2})_{73}Mo_2W_2B_{17}C_5Si_1$, $(Fe_{0.8}Cr_{0.2})_{72}Mo_2W_2B_{17}C_5Si_1Gd_1$, and $(Fe_{0.8}Cr_{0.2})_{71}Mo_2W_2B_{17}C_5Si_1Gd_2$, and $(Fe_{0.8}Cr_{0.2})_{74}Mo_2W_2B_{17}C_4Si_1$.

The powder used for wire formation is not limited to a specific microstructure and can comprised from about 0 to about 100% amorphous (metallic glass) structure. Preferably the powder utilized for wire formation will comprise a composition which, when alloyed with the metallic wire sheath, will produce an alloy composition capable of metallic glass formation. The final composition of wire produced by the present invention can preferably comprise a volume fraction contributed by powder of from about 10% to about 60%.

The particle size range for powders utilized in wire formation according to methods of the present invention is not limited to a specific value. Since wire formation does not require a specific powder size, wire formation according to methods of the present invention can utilize any non-classified powders or powder classification including sizes that are outside the preferred particle size ranges for various powder deposition techniques.

Referring again to FIG. 2, the powder from step (F) or the wire from step (G) can be utilized to treat a surface in step (H). Metallic material in powder form or in wire form can be applied to a surface in step (H) to form a layer or coating over the surface. Application of a powder or wire feedstock according to methods of the present invention is described in more detail with reference to FIG. 6.

Figure 6:
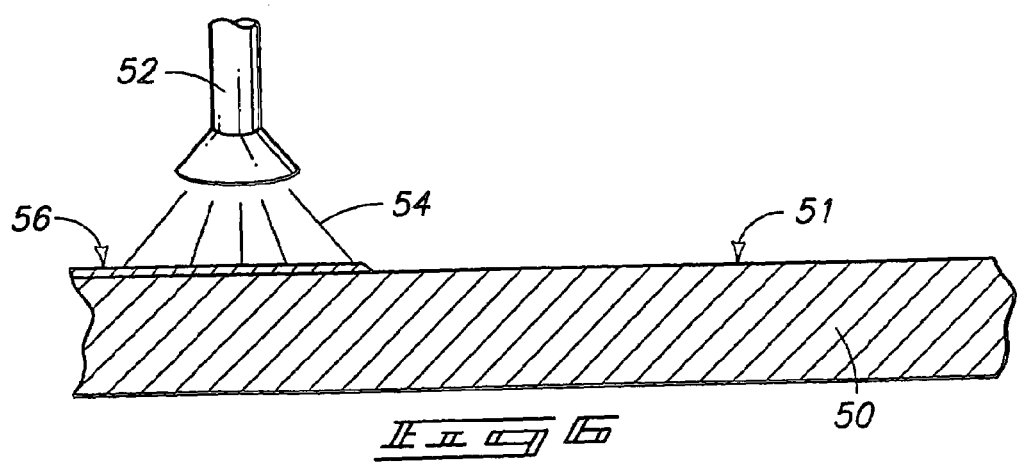
FIG. 6 is a fragmentary, diagrammatic, cross-sectional view of a metallic material substrate at a treatment step of a process encompassed by the present invention.
Figure 7:
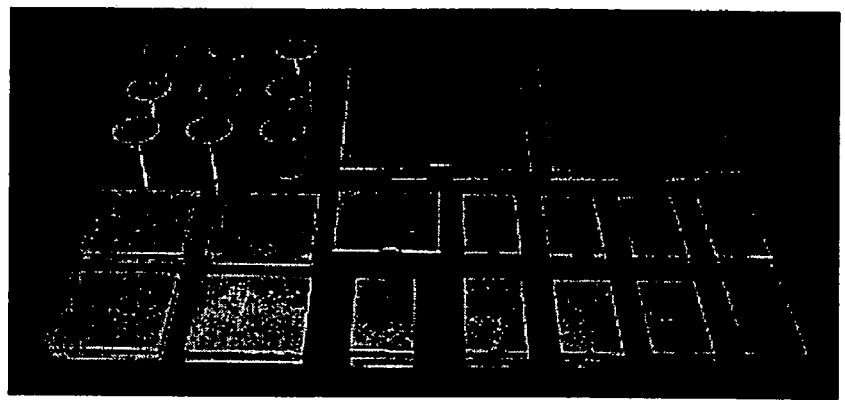
FIG. 7 shows examples of coatings comprising $Fe_{63}Cr_8Mo_2B_{17}C_5Si_1Al_4$ formed by high velocity oxy-fuel deposition onto 4340 alloy steel, 13-8 stainless steel and 7075 aluminum substrates.

As shown in FIG. 6, a substrate 50 is provided for treatment of a surface 51. Surface 51 can comprise a metal surface such as, for example, a conventional steel surface, an aluminum surface, a stainless steel surface, a tool steel surface or any other metallic surface. Alternatively, surface 51 can comprise a non-metallic material such as, for instance, a ceramic material. Powder or wire, for example powder or wire produced by the methods discussed above, can be used for feedstock for deposition onto surface 51. Exemplary surface treatment techniques for deposition of feedstock material onto surface 51 include thermal deposition techniques where feedstock is fed into a deposition device 52. The feedstock can be converted to a spray 54 and sprayed onto surface 51 to form a layer of material 56. Thermal deposition is not limited to a specific technique, and can comprise, for example, a high pressure plasma system, a low pressure plasma system, a detonation gun system, a diamond coat system, a high velocity oxy-fuel (HVOF) system, a twin roll or single roll wire-arc system, or a high velocity wire-arc system. Examples of as-sprayed HVOF coatings of composition $Fe_{63}Cr_8Mo_2B_{17}C_5Si_1Al_4$ are shown in FIG. 7.

Prior to any subsequent treatment, as-sprayed layer 56 can comprise a microstructure that includes at least some metallic glass. The amount of amorphous structure within layer 56 will depend upon the deposition method, the deposition conditions, and the composition of the feedstock material. As-sprayed, layer 56 can comprise a hardness of greater than about 9.2 GPa. Typically, layer 56 will comprise a hardness of between about 9.2 GPa and about 15.0 GPa.

Figure 8:
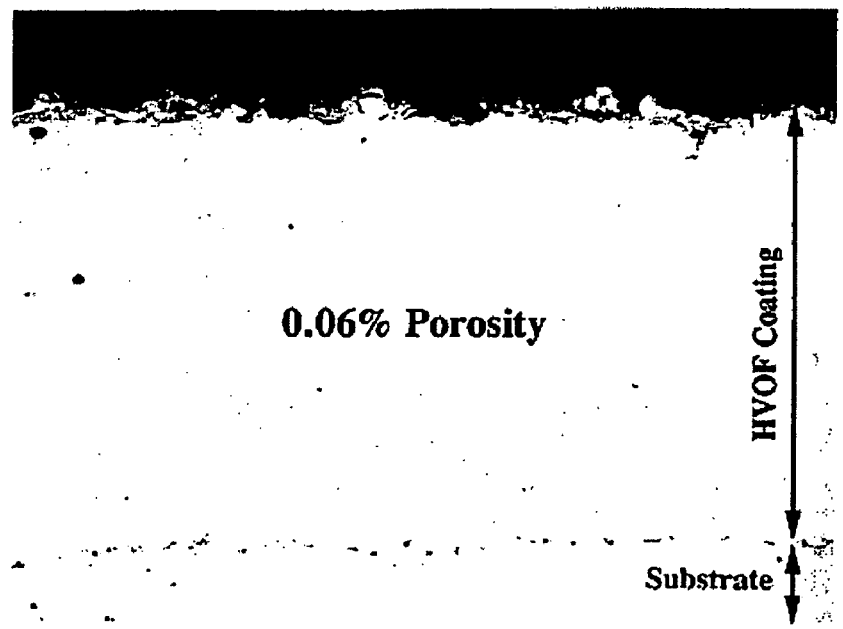
FIG. 8 shows a cross-section indicative of a porosity of a $Fe_{63}Cr_8Mo_2B_{17}C_5Si_1Al_4$ coating from FIG. 7.
Figure 9C:
FIG. 9 shows cross-sections demonstrating porosities of coatings comprising $(Fe_{0.8}Cr_{0.2})_{73}MO_2W_2B_{16}C_4Si_1Mn_2$ deposited by plasma deposition (Panel A), high velocity oxy-fuel deposition (Panel B), and Wire-Arc deposition (Panel C).
Figure 9B:
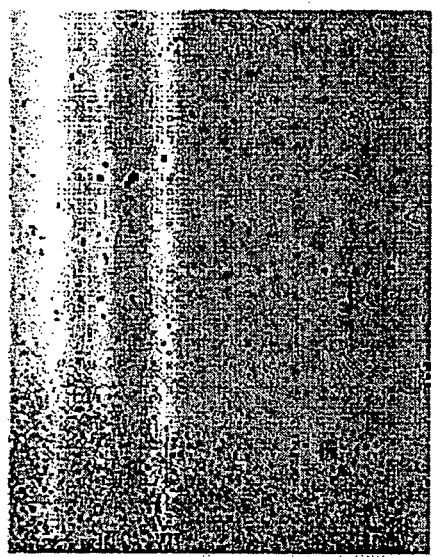
Figure 9A:
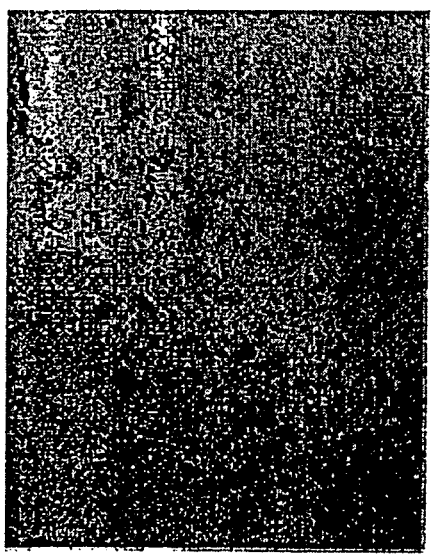

Hardness of an as-sprayed layer can be affected by porosity. It can be advantageous to produce a layer or coating comprising a low porosity since increased porosity of a material can result in a corresponding decrease in hardness of the material. As shown in FIG. 8, layer 56 can have a porosity of as low as 0.06%. Typically, layer 56 will comprise a porosity of less than or equal to about 5% (corresponding to a layer density of greater than or equal to about 95%). FIG. 9 shows porosities of $(Fe_{0.8}Cr_{0.2})_{73}Mo_2W_2B_{16}C_4Si_1Mn_2$ coatings formed by three different coating deposition techniques. The plasma coating shown in Panel A has a porosity of 0.9%, the HVOF coating in Panel B has a porosity of 0.7%, and the wire-arc coating shown in Panel C has a porosity of 3.3%. Table 2 reports the determined hardness for each of the three layers shown in FIG. 9. As will be understood by those skilled in the art, porosity of layer 56 can be increased if desired by incorporation of oxygen during the spray deposition of the layer, or by spraying with non-optimized spray parameters. It is sometimes desirable to have a higher porosity layer, for example to absorb oil.

TABLE 2

Properties of Coatings Produced by Various Spray Techniques

| PROPERTY | HVOF Coating | Plasma Coating | Wire-arc Coating |
| --- | --- | --- | --- |
| Porosity (%) | 0.7 | 0.9 | 3.3 |
| Hardness as-sprayed | 10.0 GPa | 11.0 GPa | 12.7 GPa |
| Hardness after 1 hr at 700° C. | 14.5 GPa | 13.5 GPa | 13.5 GPa |

Figure 10:
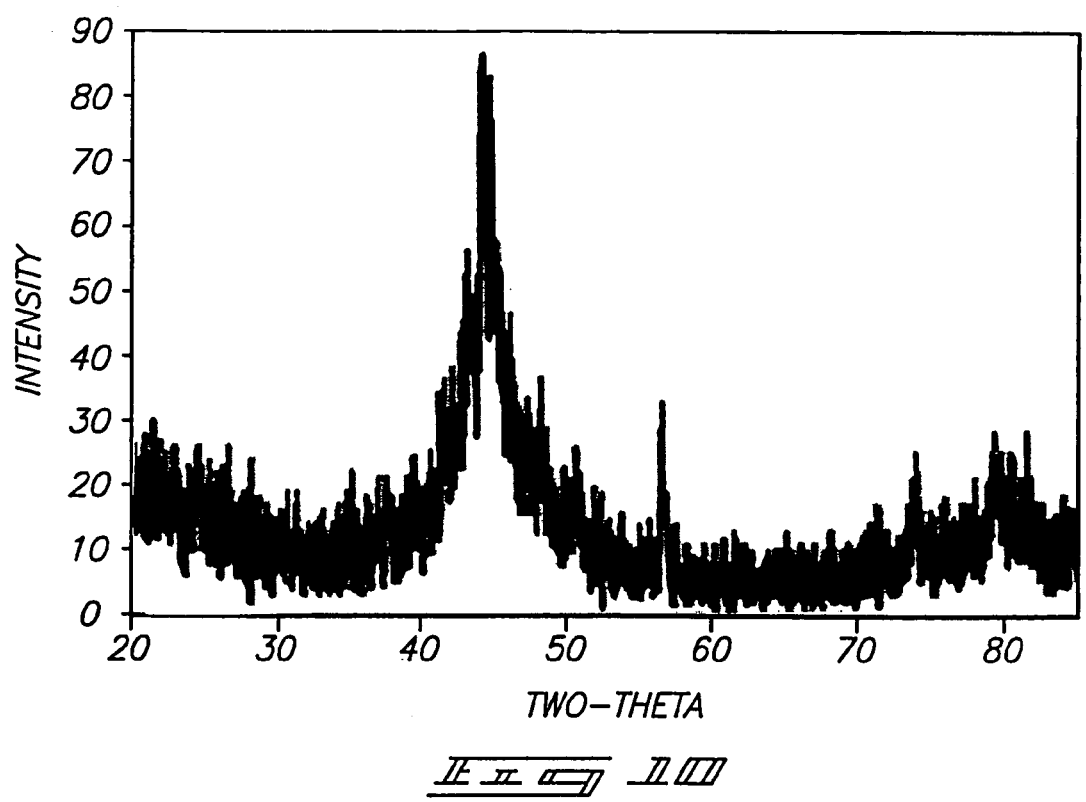
FIG. 10 illustrates an x-ray diffraction scan of a free surface of a 330 micron thick, high velocity oxy-fuel deposited coating comprising $Fe_{63}Cr_8Mo_2B_{17}C_5Si_1Al_4$.

X-ray diffraction studies performed on the free surface side of a single as-sprayed, 330 micrometer thick layer show a lack of long range ordered microstructure as shown in FIG. 10, thereby indicating an amorphous structure of the coating. As-sprayed layer 56 can comprise some measurable amorphous structure, can comprise primarily amorphous structure (greater than 50% of the microstructure), or can comprise up to about 100% amorphous structure.

Due to the lack of long range ordered microstructure in metallic glass, the presence of metallic glass allows layer 56 to be formed in the absence of any interfacial layer (such as bond coat), between coating layer 56 and surface 51 as shown in FIG. 6. An interfacial layer is not required since there is little or no crystal structure mismatch between the material of surface 51 and coating layer 56 due to the presence of amorphous microstructure within layer 56. Although FIG. 6 shows an absence of an interfacial layer, it is to be understood that the invention encompasses embodiments wherein an interfacial layer is provided (not shown).

Although FIG. 6 shows a single layer 56, it is to be understood that the present invention encompasses a coating comprising a multi-layer thickness (not shown). As-sprayed layer 56 can comprise a multi-layer thickness of from about 25 microns to about 6500 microns. If powder feedstock is utilized, layer 56 can preferably comprise a multi-layer thickness of from about 250 microns to about 350 microns. If wire feedstock is utilized, layer 56 can preferably comprise a multi-layer thickness of from about 750 microns to about 1500 microns.

Figure 11A:
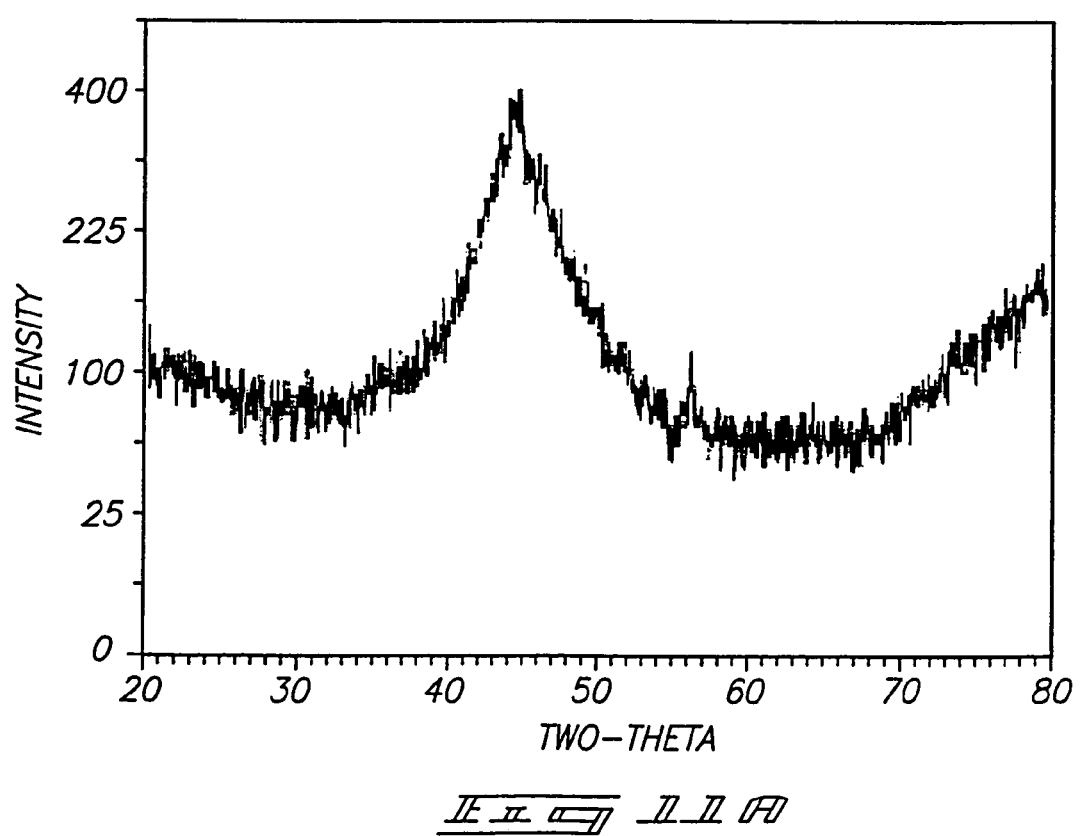
FIG. 11 illustrates x-ray diffraction scans of a free surface (Panel A) and a substrate-interface surface (Panel B) of a 1650 micron thick, plasma-sprayed coating comprising $Fe_{63}Cr_8Mo_2B_{17}C_5Si_1Al_4$.
Figure 11B:
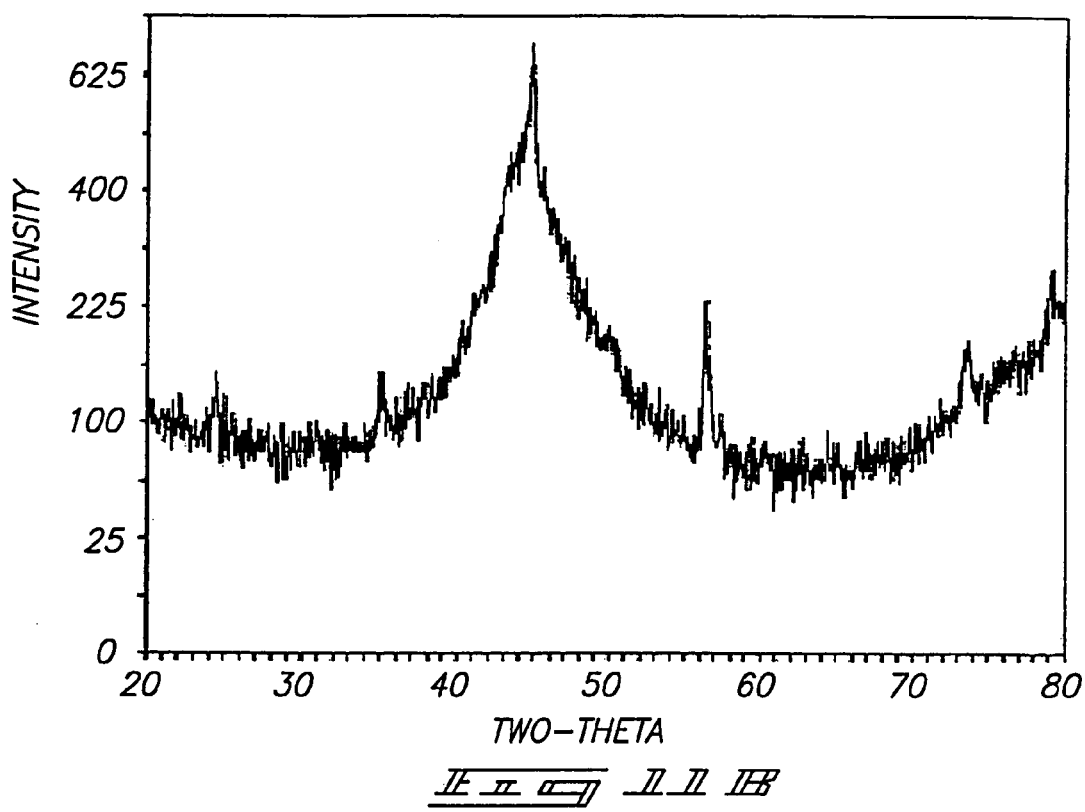
Figure 12:
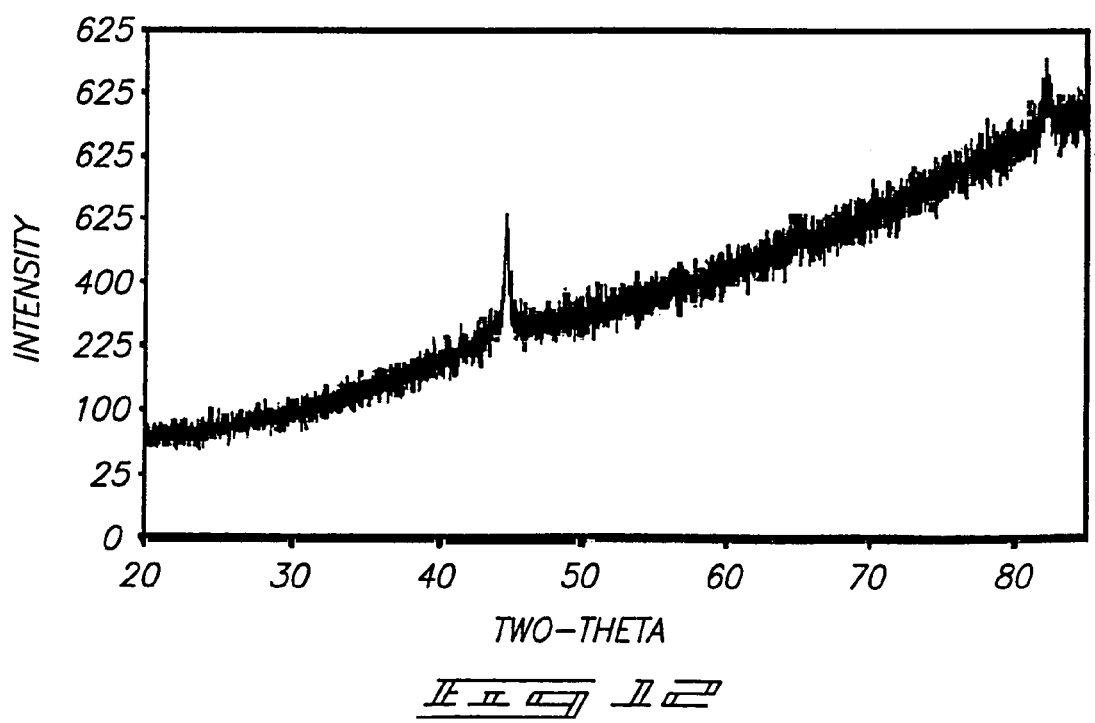
FIG. 12 illustrates an x-ray diffraction scan of a free surface of a 0.25 inch thick coating formed by wire-arc spraying utilizing a wire having the composition $(Fe_{0.8}Cr_{0.2})_{73}Mo_2W_2B_{16}C_4Si_1Mn_2$.

A coating comprising a multi-layer thickness can be formed by, for example, sequentially depositing individual layers according to the methods described above. X-ray diffraction scans of the free surface side (FIG. 11A) and the substrate surface side after delamination, FIG. 11B) of a 1650 micron thick, multilayer coating show that an amorphous structure was maintained during a multilayer plasma-deposition process. FIG. 12 shows an x-ray scan indicating the amorphous structure of a ¼ inch thick multilayer coating formed by twin-roll wire arc spray deposition.

Figure 13:
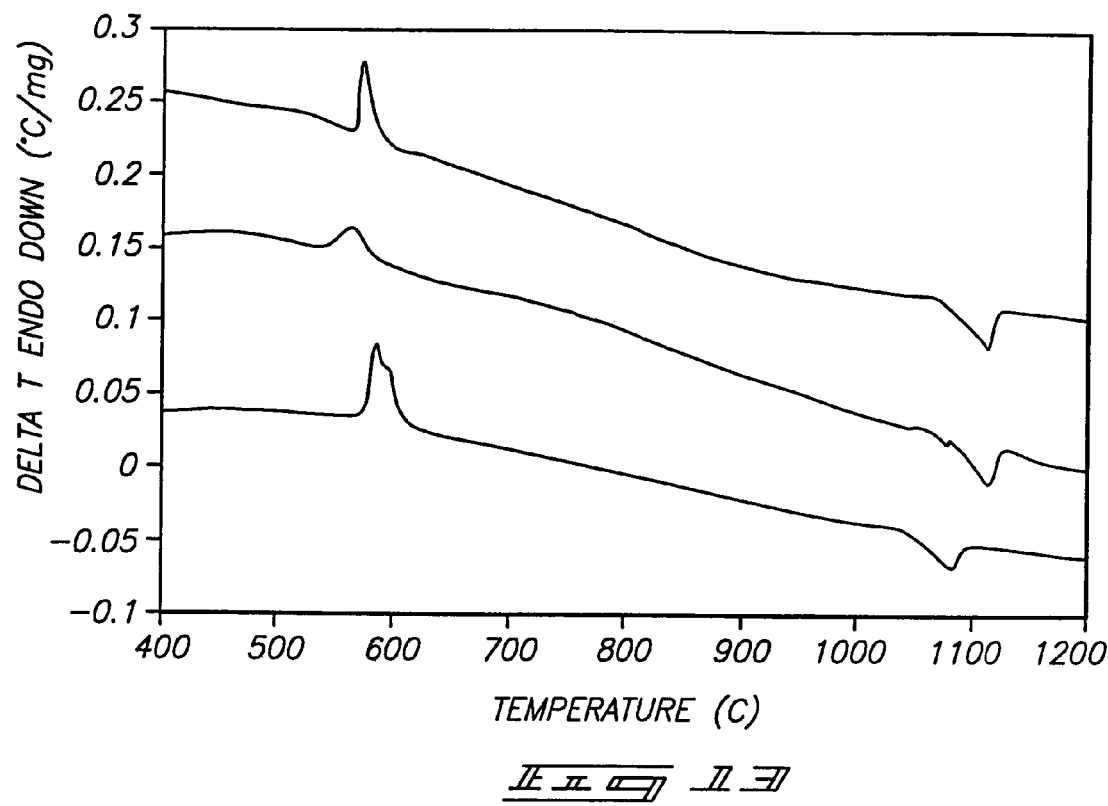
FIG. 13 illustrates data obtained from differential thermal analysis of atomized powder (top graph), a high velocity oxy-fuel coating (middle graph) and a plasma sprayed coating of the composition $Fe_{63}Cr_8Mo_2B_{17}C_5Si_1Al_4$. The graph curves show glass to crystalline transitions of the tested forms of the composition and the melting temperature of the composition.
Figure 14:
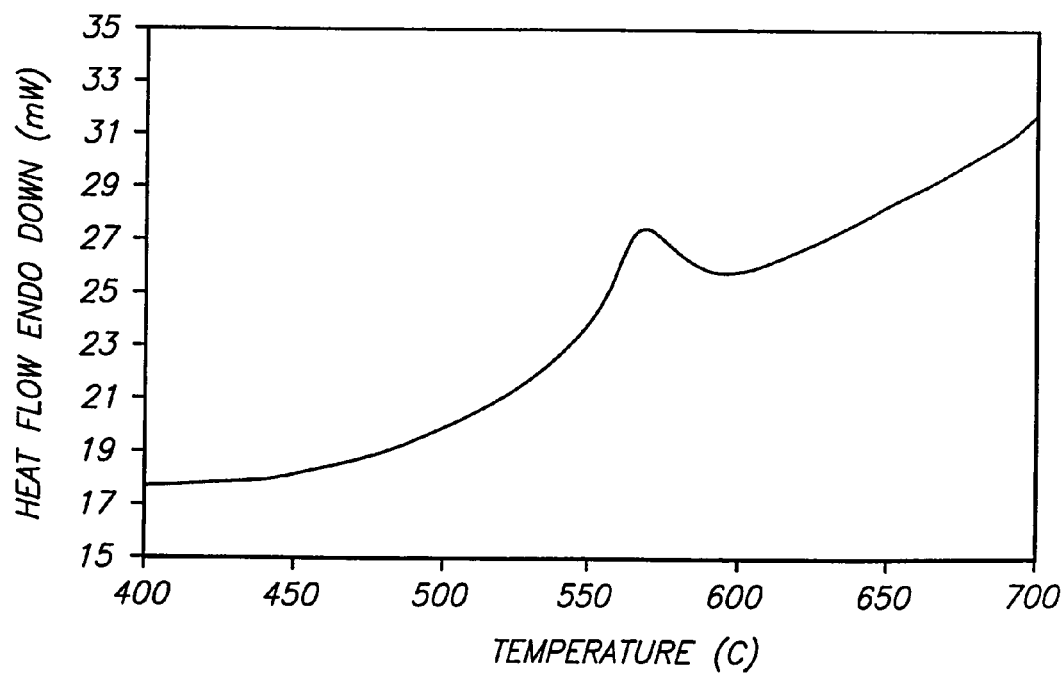
FIG. 14 illustrates differential scanning calorimetry data acquired from a 0.25 inch thick coating formed by wire-arc deposition of composition $Fe_{63}Cr_8Mo_2B_{17}C_5Si_1Al_4$. The graph shows the glass to crystalline transition of the coating.

Differential thermal analysis (DTA) was performed to show the glass to crystalline transformation for an atomized powder feedstock, an HVOF coating and a plasma spray coating, of the composition $Fe_{63}Cr_8Mo_2B_{17}C_5Si_1Al_4$. The DTA scans shown in FIG. 13, combined with differential scanning calorimetry (DSC) measurements, indicate that the powder feedstock comprised 46% glass structure, the HVOF coating contained 41% glass structure, and the plasma coating contained 86% glass structure. The DSC trace shown in FIG. 14 was obtained from a ¼ inch thick wire-arc coating of the composition $Fe_{63}Cr_8Mo_2B_{17}C_5Si_1Al_4$.

In addition to comprising a substantial hardness of at least about 9.2 GPa, as-sprayed layer 56 can comprise a substantial toughness which is increased relative to a toughness of the cooled-alloy solid mass form of the corresponding composition (discussed above). For example, when a maximum density is achieved as-sprayed layer 56 can comprise a tensile elongation up to about 60%.

Referring again to FIG. 2, once a metallic material has been applied to a surface in step (H), the metallic material can be further treated in step (I) to devitrify some or all of the metallic glass present in the metallic material to form crystalline having nanocrystalline grain size. Devitrification step (I) can result in an increased hardness of the devitrified layer relative to the as-sprayed layer.

Devitrification step (I) can comprise heat treatment of the as-sprayed layer comprising heating to a temperature from above the crystallization temperature of the particular alloy to less than the melting temperature of the alloy composition of the layer, and can comprises heating from between 1 minute to about 1000 hours. Devitrification step (I) will typically comprise heating from about 550° C. to about 850° C. for between about 10 minutes and about 1 hour.

Heat treatment of metallic glass material enables a solid state phase change wherein the amorphous metallic glass can be converted to one or more crystalline solid phases. The solid state devitrification of amorphous glass structure enables uniform nucleation to occur throughout the amorphous material to form nanocrystalline grains within the glass. The metallic matrix microstructure formed by devitrification can comprise a steel matrix (iron with dissolved interstitials) or a complex multi-phase matrix comprising several phases, one of which is ferrite. The nanocrystalline scale metal matrix composite grain structure can enable a combination of mechanical properties which are improved compared to the properties which would exist with larger grain sizes or with the metallic glass. Such improved mechanical properties can include, for example, high strength and high hardness and for particular compositions of the present invention can include a maintained or even increased toughness relative to materials comprising larger grain sizes or comprising metallic glass.

Figures 15A, 15B, 15C:
FIG. 15 shows SEM micrographs and corresponding selected area diffraction patterns of a metallic material produced from a composition comprising $(Fe_{0.8}Cr_{0.2})_{79}B_{17}W_2C_2$ by methods of the present invention after heat treatment for one hour at 700° C. (Panel A), 750° C. (Panel B) or 800° C. (Panel C).
Figures 16A, 16B, 16C:
FIG. 16 shows SEM micrographs and corresponding selected area diffraction patterns of a metallic material produced from a composition comprising $(Fe_{0.8}Cr_{0.2})_{73}$ $Mo_2W_2B_{16}C_4Si_1Mn_2$ by methods of the present invention after heat treatment for one hour at 600° C. (Panel A), 700° C. (Panel B) or 800° C. (Panel C)

The resulting structure of devitrified material can comprise nanoscale grains comprising from about 50 to about 150 nanometer grain size. Additionally, the devitrified material can comprise second phase precipitates at grain boundaries having a precipitate size of on the order of 20 nanometers. FIG. 15, FIG. 16 and FIG. 8 show TEM micrographs of the microstructure comprised by heat treated materials formed by methods of the present invention. Referring to FIG. 15, the nanocrystalline microstructure of a devitrified material comprising $(Fe_{0.8}Cr_{0.2})_{79}B_{17}W_2C_2$ is shown after treatment at various temperatures for one hour. FIG. 15 also shows a selected area diffraction pattern for each of the three treatment conditions. FIG. 16 shows the nanocrystalline microstructure and selected area diffraction patterns of a devitrified material comprising $(Fe_{0.8}Cr_{0.2})_{73}Mo_2W_2B_{16}C_4Si_1Mn_2$ after treatment at various temperatures for one hour.

Figure 17:
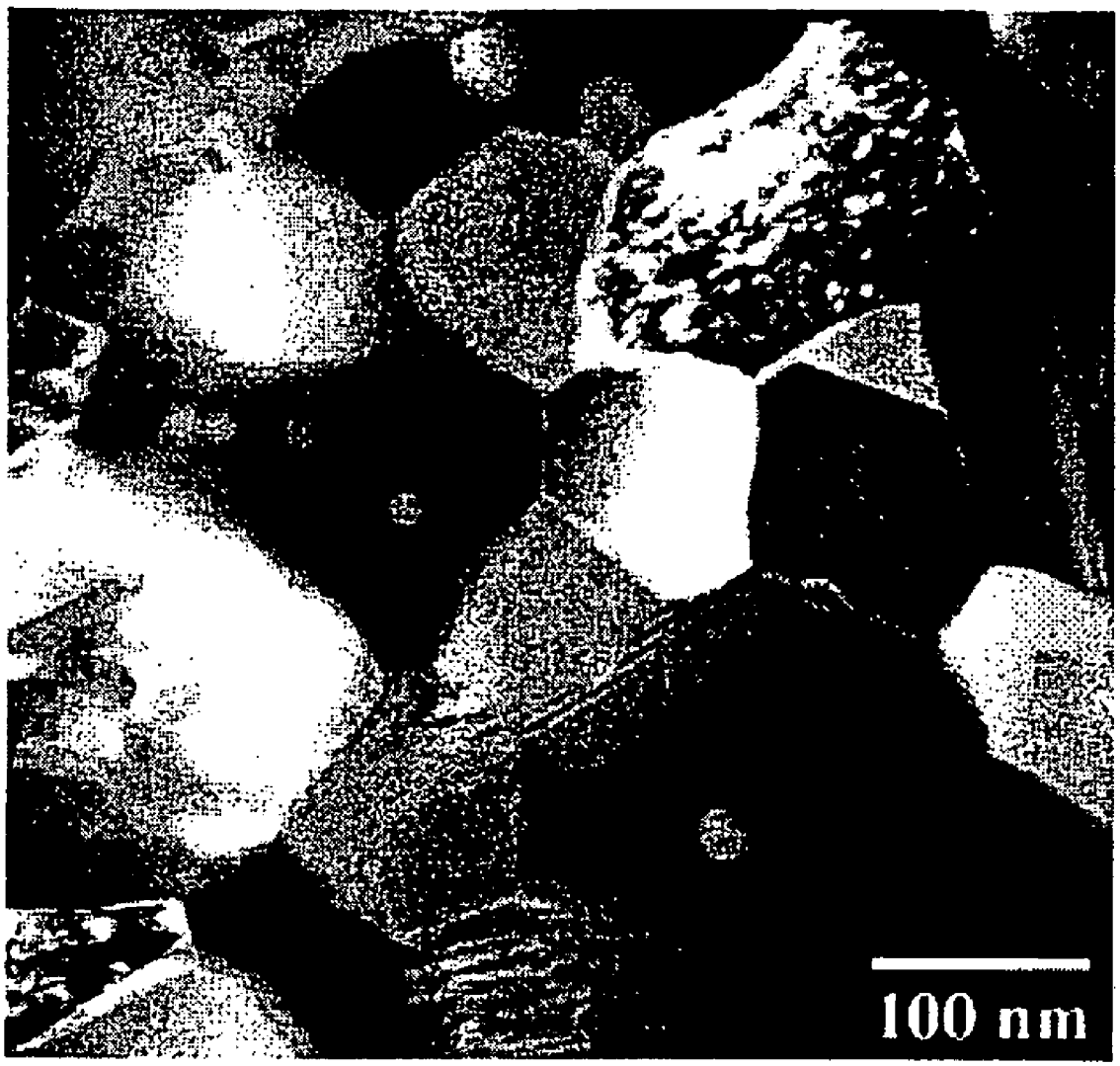
FIG. 17 is an SEM micrograph of a coating comprising $Fe_{63}Cr_8Mo_2B_{17}C_5Si_1Al_4$ formed by methods of the present invention utilizing HVOF deposition followed by treatment for one hour at 600° C.
Figures 11A, 11B:
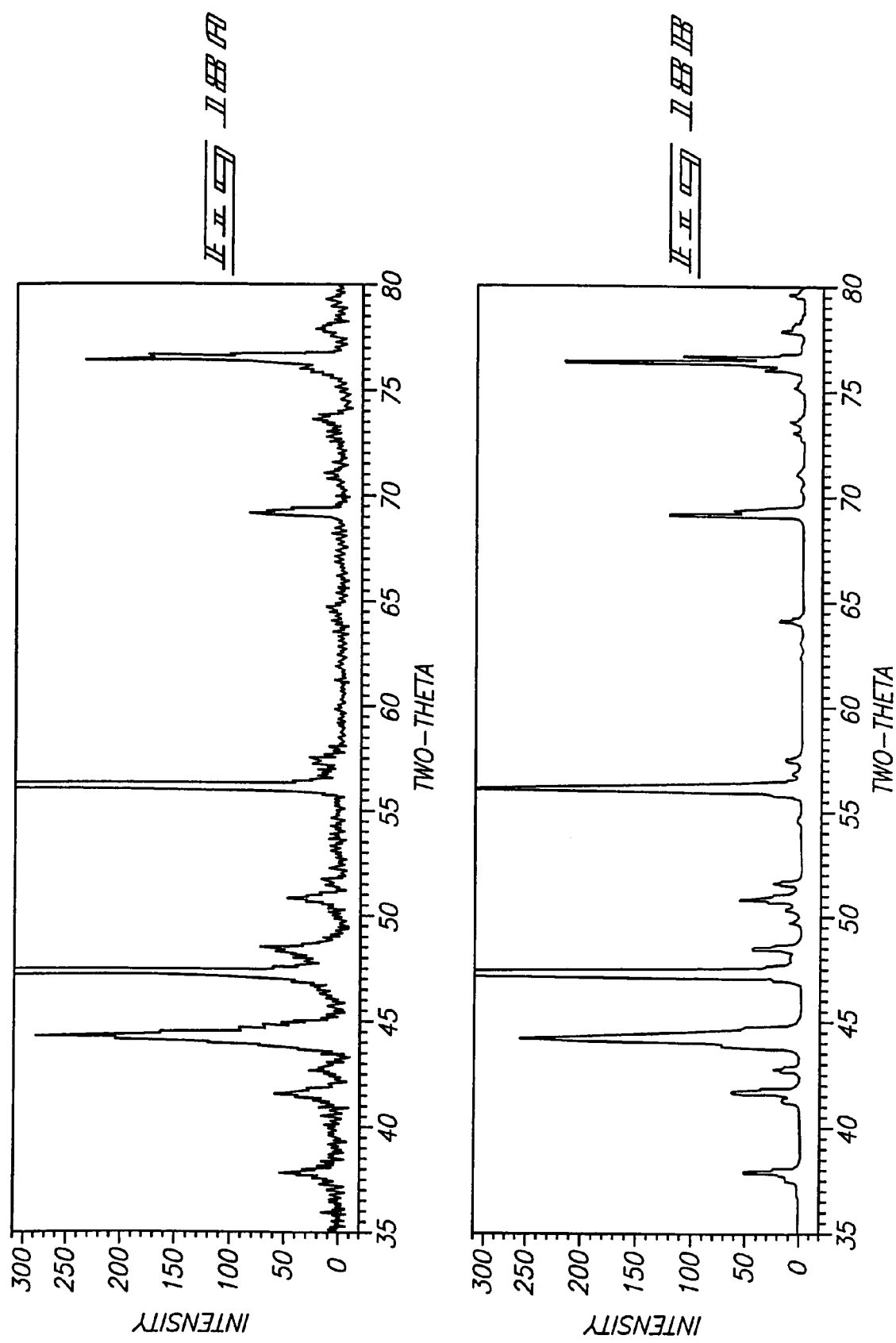

FIG. 17 shows a TEM micrograph of the nanocrystalline microstructure of a devitrified layer comprising $Fe_{63}Cr_8Mo_2B_{17}C_5Si_1Al_4$ which was formed using HVOF deposition followed by heat treatment for 1 hour at 750° C. The TEM indicates a nanoscale structure having grains from about 75 nm to about 125 nm with 20 nm second phase precipitates at the grain boundaries. The sample shown in FIG. 17 was used to obtain the x-ray diffraction data scan shown in FIG. 18, Panel A which was in turn refined as shown in FIG. 18, Panel B to identify the nanocomposite structure summarized in Table 3.

TABLE 3

Phase Information for Devitrified
$(Fe_{0.8}Cr_{0.2})_{73}Mo_2W_2B_{16}C_4Si_1Mn_2$

| Phase | Crystal System | Space Group | Lattice Parameters (Å) |
|---|---|---|---|
| α-Fe | Cubic | Im3m | a = 2.902 |
| Fe$_2$B | Tetragonal | I4/mcm | a = 5.179, c = 4.299 |
| Cr$_{23}$C$_6$ | Cubic | Fm3m | a = 10.713 |

As shown in Table 4, a devitrified nanocomposite material according to methods of the present invention can have a hardness that is increased as much as 5.2 GPa relative to the corresponding glass material (prior to devitrification). As Table 4 indicates, methods of the present invention can be utilized for production of hard glass materials or hard nanocomposite materials which have increased hardness over the corresponding ingot form even for compositions that have a hardness of less than 9.2 GPa when produced in ingot form.

TABLE 4

Hardness of Alloys in Ingot, Glass, and Nanocomposite Conditions

| Alloy Composition | Hardness (GPA) | | |
|---|---|---|---|
| | Ingot | Glass | Nanocomposite |
| $(Fe_{0.8}Cr_{0.2})_{81}B_{17}W_2$ | 4.6 | 10.3 | 15.3 |
| $(Fe_{0.8}Mo_{0.2})_{83}B_{17}$ | 5.1 | 10.5 | 15.0 |
| $(Fe_{0.8}Cr_{0.2})_{79}B_{17}W_2C_2$ | 10.8 | 11.0 | 16.2 |
| $(Fe_{0.8}Cr_{0.2})_{73}Mo_2W_2B_{16}C_4Si_1Mn_2$ | 12.3 | 11.3 | 15.2 |
| $Fe_{63}Cr_8Mo_2B_{17}C_5Si_1Al_4$ | 13.2 | 12.1 | 15.5 |

Figure 19A:
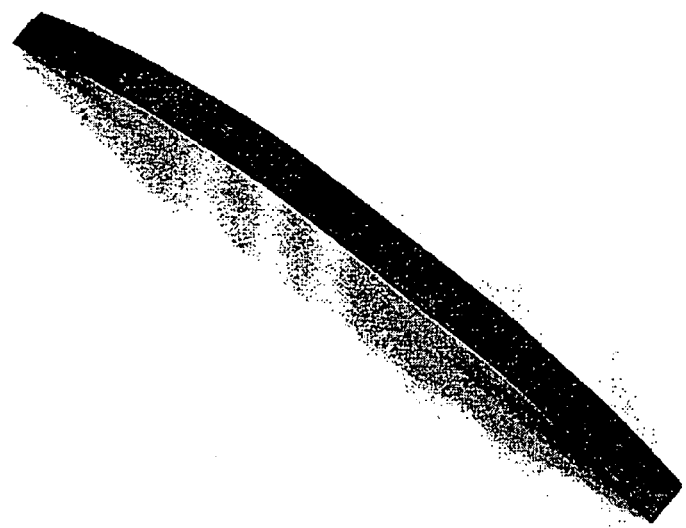
FIG. 19, Panel A shows an example of a strip of steel coated with $Fe_{63}Cr_8Mo_2B_{17}C_5Si_1Al_4$ to a thickness of approximately 200 microns. The coating was applied using high-velocity oxy-fuel deposition. Panel B and Panel C show the effects on the coating during bending of the coated strip.
Figure 19B:
Figure 19C:
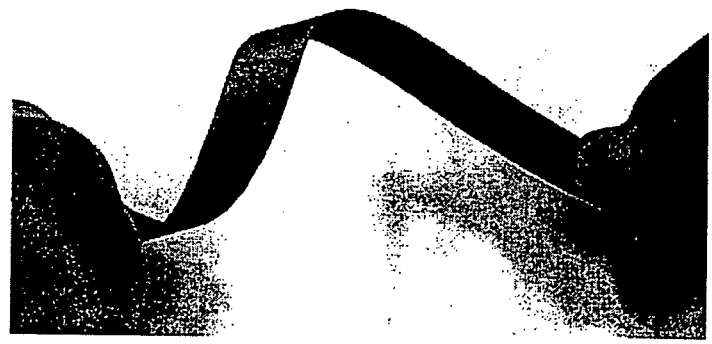
Figure 20A:
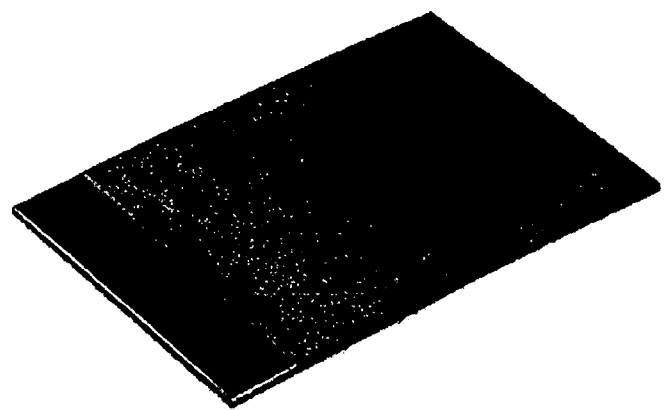
FIG. 20 shows a flat plate of base-metal with an approximately 200 micron thick coating of $Fe_{63}Cr_8Mo_2B_{17}C_5Si_1Al_4$ formed by high velocity oxy-fuel deposition. Identically formed plates were used to show a plate as formed (Panel A), a plate after being repeatedly hammered on the coating side (Panel B) or on the substrate side (Panel C), and a plate after sever plastic deformation (Panel D).
Figure 20B:
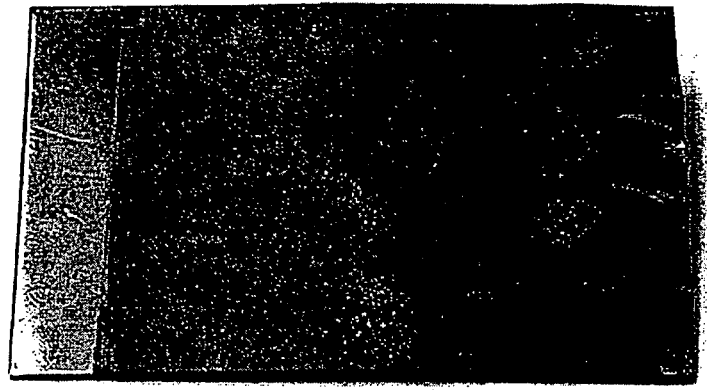
Figure 20C:
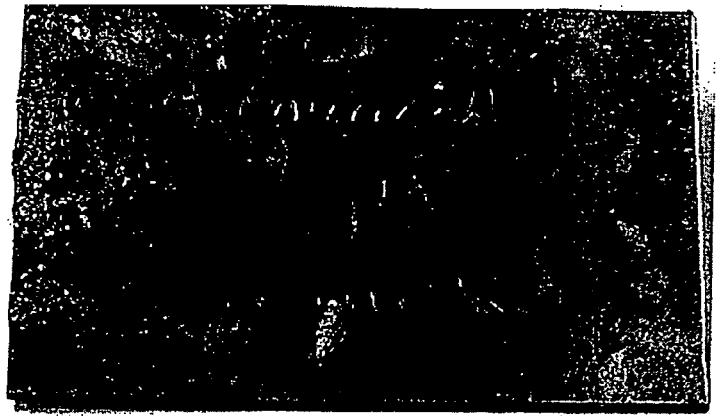
Figure 20D:
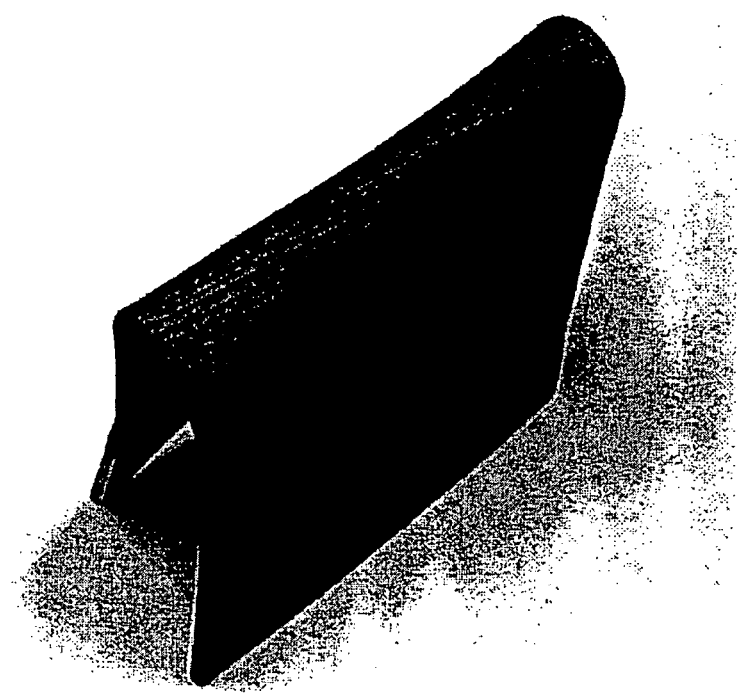
Figure 21A:
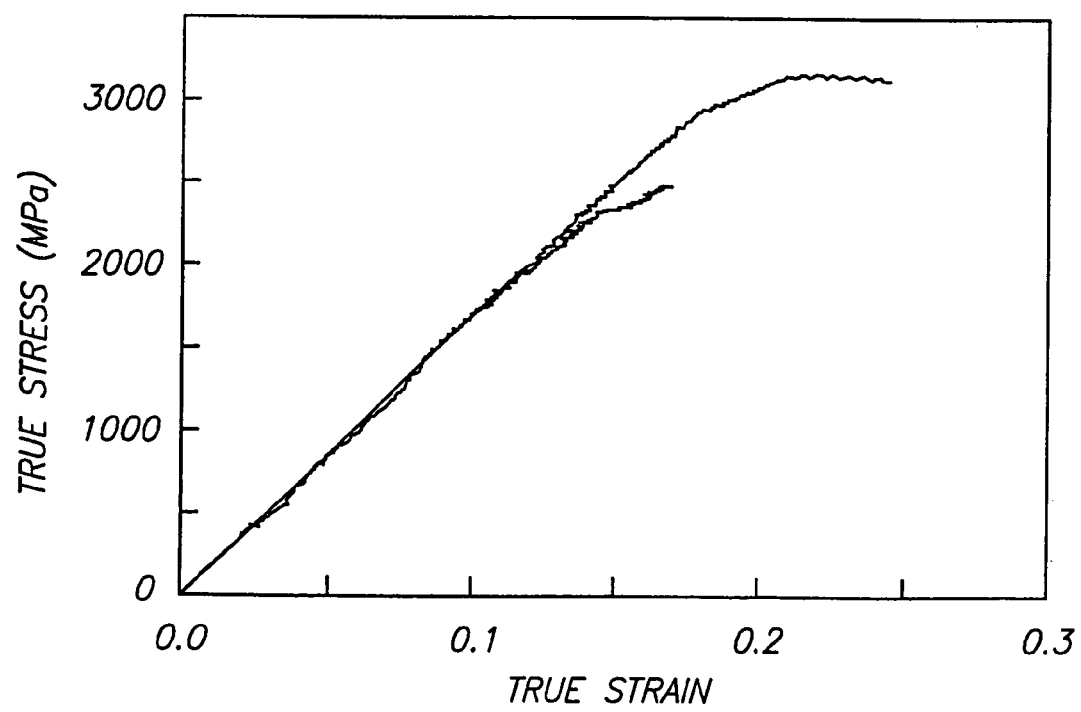
FIG. 21 illustrates true-stress/true-strain measurements obtained from metallic ribbons comprising metallic glass of the composition $(Fe_{0.8}Cr_{0.2})_{81}B_{17}W_2$. The graph curves reflect data obtained at 20° C. at a strain rate of $10^{-3}s^{-1}$ (Panel A); at 450° C. (Panel B) at strain rates of $10^{-4}s^{-1}$ (closed circles) and $10^{-2}s^{-1}$ (open circles); at 500° C. (Panel C) at strain rates of $10^{-4}s^{-1}$ (closed circles), $10^{-2}s^{-1}$ (open circles) and $10^{-1}s^{-}$ (triangles); and at 550° C. (Panel D) at strain rates of $10^{-1}s^{-1}$ (open circles) and $10^{-2}s^{-1}$ (closed circles).
Figure 21B:
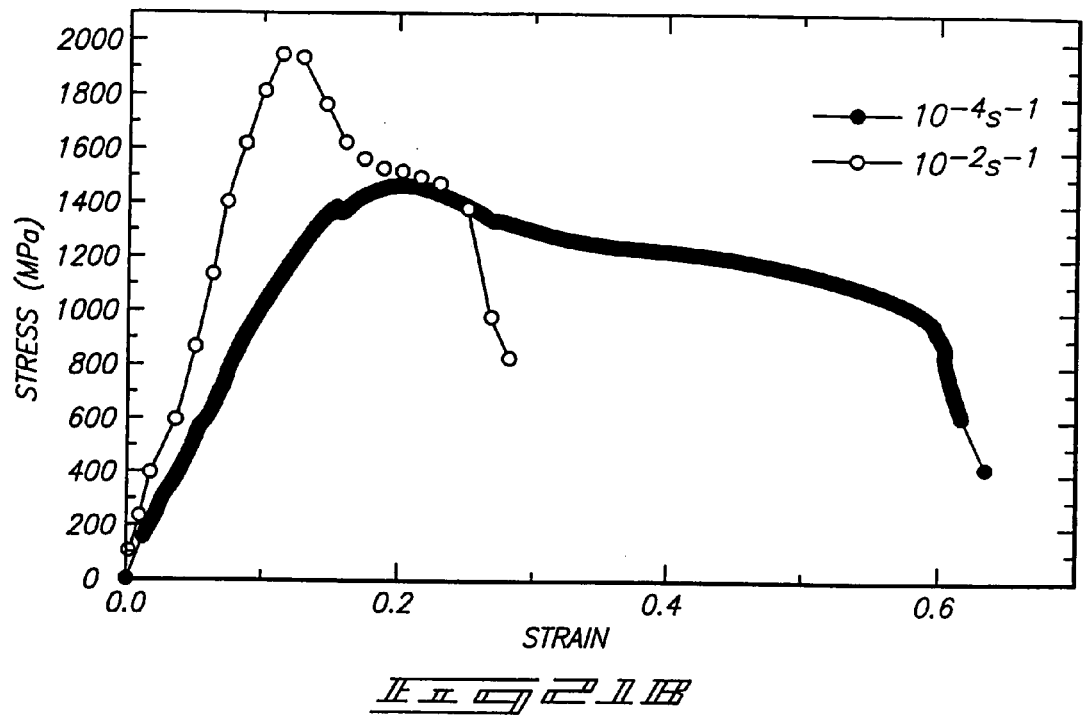
Figure 21C:
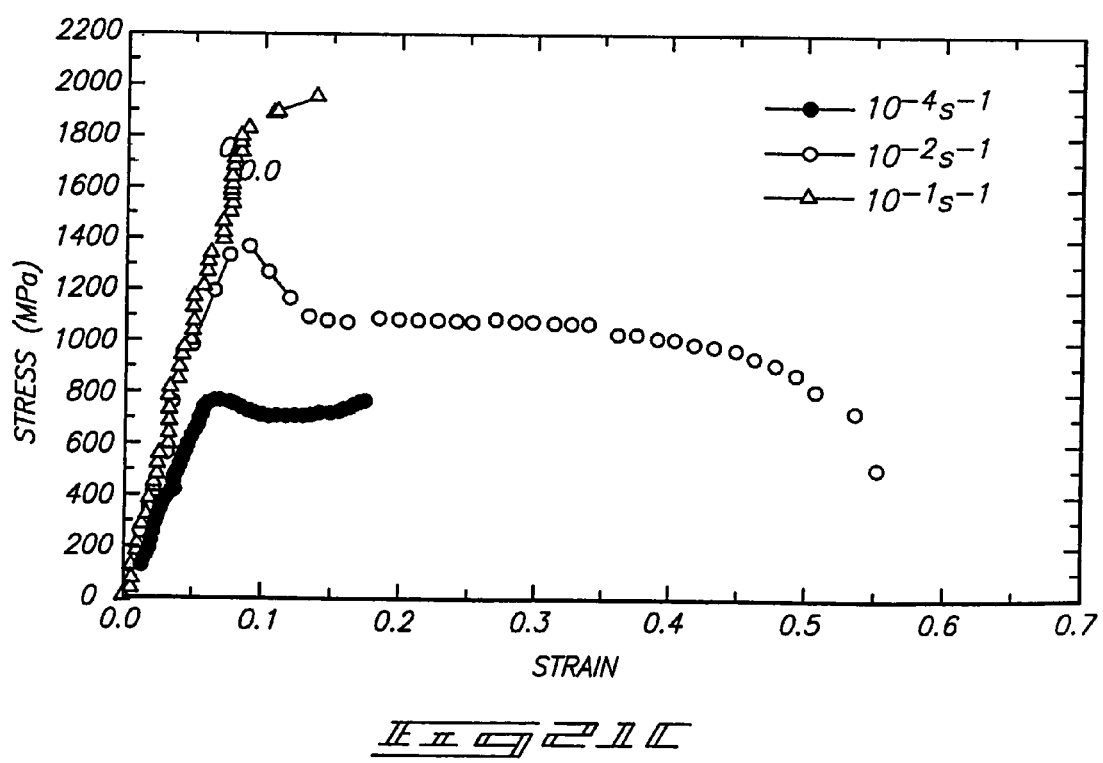
Figure 21D:
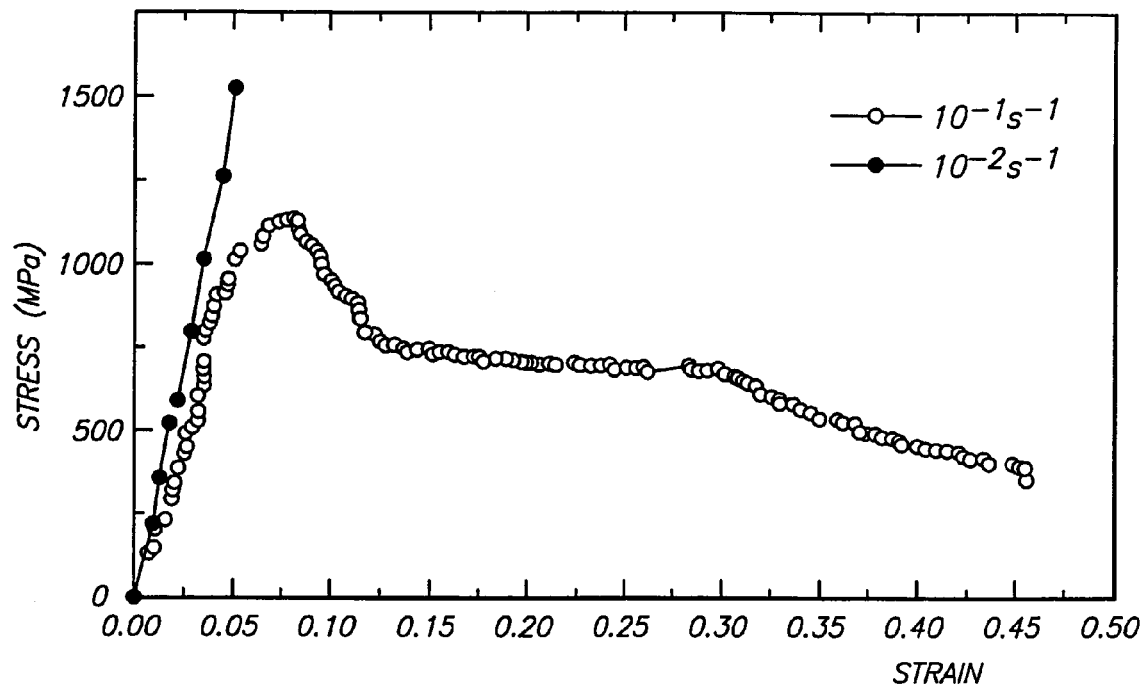

Various methods were utilized to measure properties of devitrified materials produced by methods of the present invention. The ability to adhere to an underlying material was tested by conventional testing methods including drop-impact test, bend test and particle impact erosion test. The coatings were able to pass all three of these tests. FIG. 19 illustrates the elastic and plastic ductility (resiliency) of a coating comprising $Fe_{63}Cr_8Mo_2B_{17}C_5Si_1Al_4$. A steel strip which has been coated with approximately 200 micron thickness of coating material by HVOF deposition is shown in Panel A. Panel B and Panel C show the lack of chipping cracking or peeling away of the coating from the base metal upon deformation of the coated strip.

FIG. 20, Panel A shows an approximately 200 micron thick $Fe_{63}Cr_8Mo_2B_{17}C_5Si_1Al_4$ coating on a flat plate. As shown, the coating demonstrates high ductility and toughness since it is able to deform with the base metal during repeated hammering on the coating side (Panel B) or repeated hammering on the substrate side (Panel C). Additionally, no observable cracking, chipping or pulling away of the coating was detected upon severe deformation of the plate (Panel D).

Figure 22:
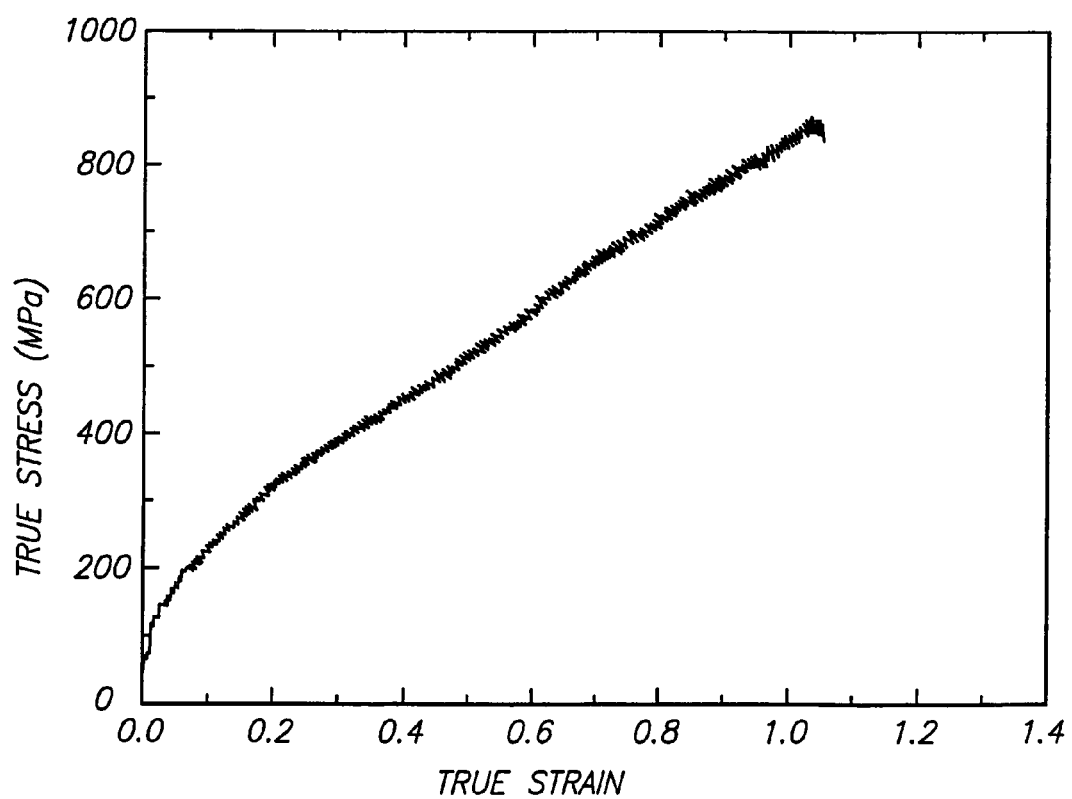
FIG. 22 illustrates true-stress/true-strain measurements obtained from metallic ribbons of the composition $(Fe_{0.8}Cr_{0.2})_{81}B_{17}W_2$ after crystallization. The curve reflects data obtained at 750° C. at a strain rate of $10^{-4}s^{-1}$. Crystallization was achieved by heating the composition to above the crystallization temperature but lower than the melting temperature of the composition.

Tensile properties of coating produced by methods of the present invention were measured by forming metallic ribbons of the composition to be tested. Both metallic glass ribbons (FIG. 21) and devitrified ribbons (FIG. 22) were subjected to various strain rates at a number of temperatures. The stress/strain curves for metallic glass show that elongation as high as 60% is attainable (FIG. 21, Panel A). The devitrified ribbon can exhibit superplasticity, having a maximum elongation of up to about 180% (FIG. 22).

The methodology described herein can have application for a number of uses including, but not limited to, such uses as protective coatings and hard-facing. In such applications, metallic coatings produced by methods of the present invention can be used on surfaces of parts, devices, and machines to protect such surfaces from one or more of corrosion, erosion, and wear. Such applications can utilize either as-sprayed coatings comprising metallic glasses or devitrified material comprising nanocomposite structure. Additionally, such applications can utilize coatings having some metallic glass structure and some nanocomposite structure. Such partially-glass/partially-nanocomposite coatings can be formed by, for example, sequentially forming individual layers and heat treating only specific layers, or by sequentially forming one or more layers and only heat treating a portion of the one or more layers.

Due to the hardness of as-sprayed metallic glass materials formed by methods of the present invention, coatings can utilize the as-sprayed material without further devitrification. In other applications where an increased hardness is desired, full devitrification can be performed and can achieve up to 100% nanocomposite microstructure comprising extreme hardness. The increase in hardness produced by methods of the present invention can be achieved without an accompanying loss of toughness, and can even be accompanied by an increased toughness.

In compliance with the statute, the invention has been described in language more or less specific as to structural and methodical features. It is to be understood, however, that the invention is not limited to the specific features shown and described, since the means herein disclosed comprise preferred forms of putting the invention into effect. The invention is, therefore, claimed in any of its forms or modifications within the proper scope of the appended claims appropriately interpreted in accordance with the doctrine of equivalents.

The invention claimed is:

1. A method of forming a hardened surface on a substrate, comprising:
   providing a solid mass comprising a first hardness;
   processing the solid mass to form a powder;

combining the powder with a metal strip to form a wire, the wire having a final composition comprising at least 55% iron by weight and at least one element selected from the group consisting of Si, C, P and B;

applying the final composition to a surface of a substrate to initially form a layer having a second hardness, at least some of the layer comprising metallic glass, the applying comprising at least one of twin-roll wire arc deposition, single-roll wire arc deposition and high-velocity wire arc deposition; and converting at least some of the metallic glass to a crystalline material having a nanocrystalline grain size, the converting hardening the layer to form a hardened layer having a third hardness that is greater than the first hardness and greater than the second hardness.

2. The method of claim 1 wherein the initially-formed layer comprises an amorphous structure.

3. The method of claim 1 wherein the hardened layer comprises a nanocomposite microstructure having a grain size of from about 75 nm to about 125 nm, and having second phase precipitates of about 20 nm at grain boundaries.

* * * * *